(12) United States Patent
Joo et al.

(10) Patent No.: US 8,801,911 B2
(45) Date of Patent: Aug. 12, 2014

(54) DEVICE AND METHOD OF MANIPULATING PARTICLES

(75) Inventors: Sang-Woo Joo, Gyeongsan-si (KR); Ashutosh Sharma, Gyeongsan-si (KR); Shizhi Qian, Gyeongsan-si (KR)

(73) Assignee: Industry-Academic Cooperation Foundation, Yeungnam University, Gyeongsan-si, Gyeongsangbuk-do (KR)

( * ) Notice: Subject to any disclaimer, the term of this patent is extended or adjusted under 35 U.S.C. 154(b) by 216 days.

(21) Appl. No.: 13/249,431

(22) Filed: Sep. 30, 2011

(65) Prior Publication Data

US 2013/0081945 A1    Apr. 4, 2013

(51) Int. Cl.
*C25B 15/00* (2006.01)
*B81B 1/00* (2006.01)
*B82Y 99/00* (2011.01)

(52) U.S. Cl.
USPC .......................................... 204/547; 204/643

(58) Field of Classification Search
USPC .......... 204/450–455, 545, 547, 600–605, 643
See application file for complete search history.

(56) References Cited

U.S. PATENT DOCUMENTS 6,696,020 B1 *  2/2004  Manz et al. ..................... 422/52
2004/0011650 A1 *  1/2004  Zenhausern et al. .......... 204/547

OTHER PUBLICATIONS

S. E. Yalcin, et al. "Manipulating particles in microfluidics by floating electrodes", Electrophoresis, vol. 31, No. 22, Nov. 2010, p. 3711-3718.*

* cited by examiner

*Primary Examiner* — J. Christopher Ball
(74) *Attorney, Agent, or Firm* — Sherr & Jiang, PLLC

(57) ABSTRACT

Provided is a device and method of manipulating particles. The device includes: a channel for accommodating an electrolyte solution including particles to be manipulated; an anode and cathode for imposing a direct current (DC) electric field on the channel; metal strip(s) attached to an inner wall of the channel and resulting in induced-charge electroosmosis near a surface of the channel; a DC power supply unit for supplying a DC voltage to the anode and the cathode of the channel; control electrodes on both sides of the metal strip(s) to locally tune the induced-charge electroosmosis on the metal strip(s) regardless of the global electric field across the channel; and a DC power supply unit for supplying a DC voltage to the control electrodes.

7 Claims, 14 Drawing Sheets

DEVICE AND METHOD OF MANIPULATING PARTICLES

BACKGROUND OF THE INVENTION

1. Field of the Invention

The present invention relates to a device and method of manipulating particles, and more particularly, to a device and method for manipulating particles, wherein particles moving in a micro/nanofluidic channel are easily manipulated.

2. Description of the Related Art

Generally, in application of microfluidics and nanofluidics, interfacial electrokinetic phenomena, such as electroosmosis and electrophoresis, are widely used.

For example, since it is easy to fabricate an electrode in a lab on a chip device, electrokinetic manipulation of bioparticles such as focusing, trapping, concentration, and separation are widely performed.

However, a conventional device for manipulating particles by using an electrokinetic phenomenon includes a channel only having a dielectric wall and a unit for adjusting an external electric field imposed across the micro/nano channel, and thus it is difficult to manipulate positions of the particles in the micro/nano channel.

SUMMARY OF THE INVENTION

The present invention provides a device and method of manipulating particles, wherein particles are easily adjusted by using a floating electrode at an inner side of a channel.

The present invention also provides a device and method of manipulating particles, wherein particles are easily adjusted by using a small voltage by providing a control electrode to a channel.

According to an aspect of the present invention, there is provided a device for manipulating particles, the device including: a channel for accommodating an electrolyte solution including particles to be manipulated; an anode and cathode for imposing a direct current (DC) electric field on the channel; a floating electrode attached to an inner wall of the channel and resulting in induced-charge electroosmosis near a surface of the channel; and a DC power supply unit for supplying a DC voltage to the anode and the cathode.

The channel may have a micro or nano-size. The particles may be any one selected from the group consisting of polymers, metals, proteins, nucleic acids, cells, molecules, semiconducting particles, bioactive substances, and mixed particles thereof. The floating electrode may be a metal strip.

The device may further include: two control electrodes respectively disposed on sides of the floating electrode and capable of independently tuning induced-charge electroosmosis engendered by the floating electrode regardless of a global electric field across the channel by locally controlling the DC voltage applied to the anode and cathode; and a local control DC power supply unit for supplying a DC voltage to the two control electrodes.

The two control electrodes may have a micro or nano-size.

According to another aspect of the present invention, there is provided a device for manipulating particles, the device including: a channel for accommodating an electrolyte solution including particles to be manipulated; an anode and cathode for imposing a direct current (DC) electric field on the channel; a plurality of metal strips attached to an inner wall of the channel and resulting in induced-charge electroosmosis near surface of the channel; and a DC power supply unit for supplying a DC voltage to the anode and the cathode.

The channel may have a micro or nano-size. The particles may be any one selected from the group consisting of polymers, metals, proteins, nucleic acids, cells, molecules, semiconducting particles, bioactive substances, and mixed particles thereof.

According to another aspect of the present invention, there is provided a method of manipulating particles, the method including: providing a device for manipulating particles, the device including: a channel for accommodating an electrolyte solution including particles to be manipulated; an anode and cathode for imposing a direct current (DC) electric field on the channel; a floating electrode attached to an inner wall of the channel and resulting in induced-charge electroosmosis near a surface of the channel; and a DC power supply unit for supplying a DC voltage to the anode and the cathode, providing the electrolyte solution including the particles into the channel; and manipulating the particles in the electrolyte solution by adjusting strength of the DC electric field imposed on the channel.

The channel may have a micro or nano-size. The particles may be any one selected from the group consisting of polymers, metals, proteins, nucleic acids, cells, molecules, semiconducting particles, bioactive substances, and mixed particles thereof. The strength of the DC electric field imposed on the channel may be controlled such that the particles are locally concentrated in a part or at an end of the channel.

The strength of the DC electric field imposed on the channel may be controlled such that the particles move toward either the cathode or the anode.

According to another aspect of the present invention, there is provided a method of manipulating particles, the method including: providing a device for manipulating particles in an electrolyte solution, the device including: a channel for accommodating an electrolyte solution including particles to be manipulated; an anode and cathode for imposing a direct current (DC) electric field on the channel; a floating electrode attached to an inner wall of the channel and resulting in induced-charge electroosmosis near a surface of the channel; a DC power supply unit for supplying a DC voltage to the anode and the cathode; two control electrodes respectively disposed on sides of the floating electrode and capable of independently tuning induced-charge electroosmosis engendered by the floating electrode regardless of a global electric field across the channel by locally controlling the DC voltage applied to the anode and cathode; and a local control DC power supply unit for supplying a DC voltage to the two control electrodes, providing the electrolyte solution including the particles into the channel; imposing an electric field on the channel by applying a DC voltage to the anode and the cathode; and manipulating the particles in the electrolyte solution by locally controlling a magnitude and polarity of the DC voltage applied to the two control electrodes.

The magnitude and polarity of the DC voltage applied to the two control electrodes may be controlled such that the particles are enriched and the enriched particles are kept stationary at a prescribed position inside the channel.

According to another aspect of the present invention, there is provided a method of manipulating particles, the method including: providing a device for manipulating particles, the device including: a channel for accommodating an electrolyte solution including particles to be manipulated; an anode and cathode for imposing a direct current (DC) electric field on the channel; a plurality of metal strips attached to an inner wall of the channel and resulting in induced-charge electroosmosis near surfaces of the channel; and a DC power supply unit for supplying a DC voltage to the anode and the cathode, providing the electrolyte solution including the particles into the channel; and manipulating the particles in the electrolyte solution by adjusting strength of the DC electric field imposed on the channel.

The channel may have a micro or nano-size. The particles may be any one selected from the group consisting of polymers, metals, proteins, nucleic acids, cells, molecules, semiconducting particles, bioactive substances, and mixed particles thereof. The two control electrodes may have a micro or nano-size. The strength of the DC electric field imposed on the channel may be controlled such that the particles are concentrated between the two metal strips and then subsequently squeezed into a stream flowing in a center region of the channel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Meanings of terms or words used herein should not be limited to common meanings or those defined in dictionaries, and should be interpreted as having meanings corresponding to the technical aspect of the present invention based on the principle that the inventor may suitably define the terms or words to describe the invention best possible.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
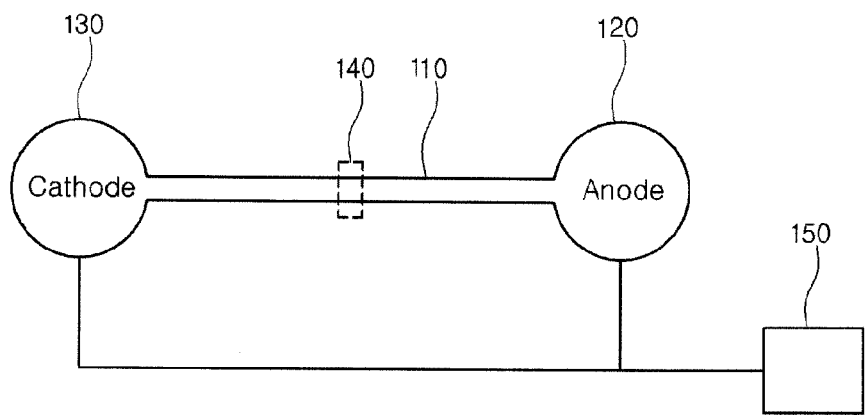
FIG. 1 is a plan view of a device for manipulating particles, according to an embodiment of the present invention.

Referring to FIG. 1, a device 100 for manipulating particles according to an embodiment of the present invention includes a channel 110, an anode 120, a cathode 130, a floating electrode 140, and a direct current (DC) power supply unit 150.

The channel 110 is a space for accommodating an electrolyte solution including particles to be manipulated, has a micro or nano-size, and is formed of glass or polydimethylsiloxane (PDMS). In the current embodiment, the channel 110 is formed of glass or PDMS, but the channel 110 may be formed of another dielectric material.

Also, the particles included in the electrolyte solution is any one selected from the group consisting of polymers, metals, proteins, nucleic acids, cells, molecules, semiconducting particles, bioactive substances, and mixed particles thereof.

The anode 120 and the cathode are respectively positioned at ends of the channel 110, and impose a DC electric field on the channel 110. The DC power supply unit 150 is electrically connected to the anode 120 and the cathode 130 to apply a DC voltage to the anode 120 and the cathode 130, thereby forming a DC electric field in the channel 110.

The floating electrode 140 may be a metal strip, and is attached to a bottom inner wall of the channel 110. In the current embodiment, the floating electrode 140 is located at the bottom inner wall of the channel 110, but the location of the floating electrode 140 is not limited to the bottom inner wall, and may be anywhere in the channel 110. The floating electrode 140 results in induced-charge electroosmosis near a surface of the channel 110.

The floating electrode 140 attached to the bottom inner wall of the channel 110 is polarized by an external electric field engendered by the anode 120 and the cathode 130, and engenders a nonuniform surface charge on the surface of the channel 110. The polarized floating electrode 140 is negatively charged near an anodic side (close to the anode 120) and is positively charged near a cathodic side (close to the cathode 130), and a net induced charge is zero over an entire surface of the floating electrode 140 constituting the metal strip. An amount of surface charge induced to the metal strip is proportional to a strength of the imposed external electric field. An interaction between mobile ions in an electrical double layer (EDL) of the floating electrode 140 and the imposed electric field induces induced-charge electroosmotic (ICEO) flow. The ICEO flow forms two eddies near the floating electrode 140 that is oppositely charged. The ICEO flow around the floating electrode 140 affects an overall hydrodynamic field as well as particle electrokinetic motion through an interplay between hydrodynamics and electrostatics, thereby controlling flow of the particles.

FIGS. 2A through 2D are graphs showing fluorescent intensity (IF) distributions of 500 nm fluorescent particles near the floating electrode 140 and the anode 120 of the device 100 of FIG. 1 in an 1 mM KCl solution respectively under external electric fields of 30 V/cm, 50 V/cm, 70V/cm, and 90V/cm. The IF is a deviation of the cross-sectional averaged IF at time t from the IF at t=0 when an electric field is imposed. An origin of an axial distance is an anodic edge of the floating electrode 140 shown in FIG. 1. A net fluid motion is directed from right to left.

Figure 2A:
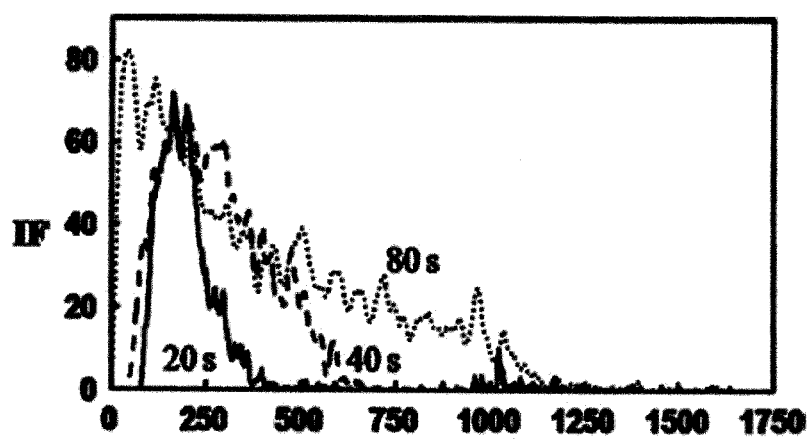
FIGS. 2A through 2D are graphs showing fluorescent intensity (IF) distributions of the device of FIG. 1 in an 1 mM KCl solution respectively under external electric fields of 30 V/cm, 50 V/cm, 70V/cm, and 90V/cm.
Figure 2B:
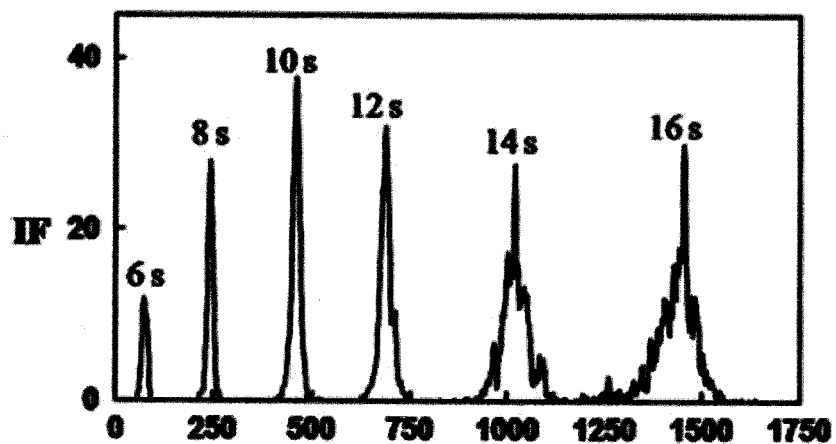
Figure 2C:
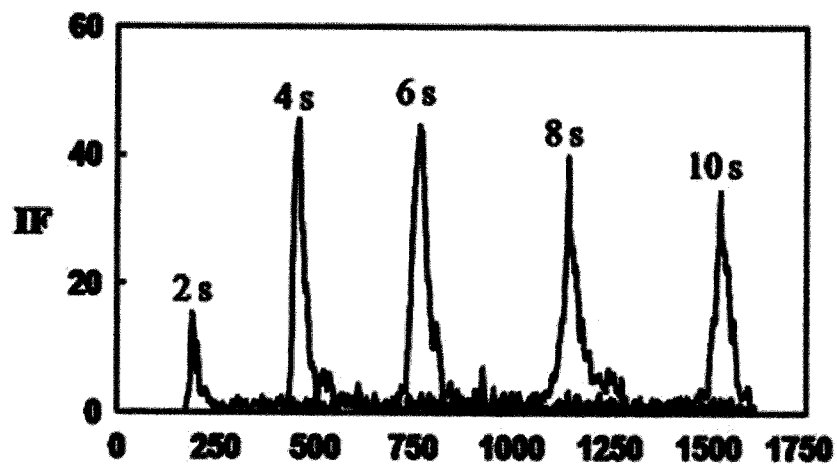
Figure 2D:
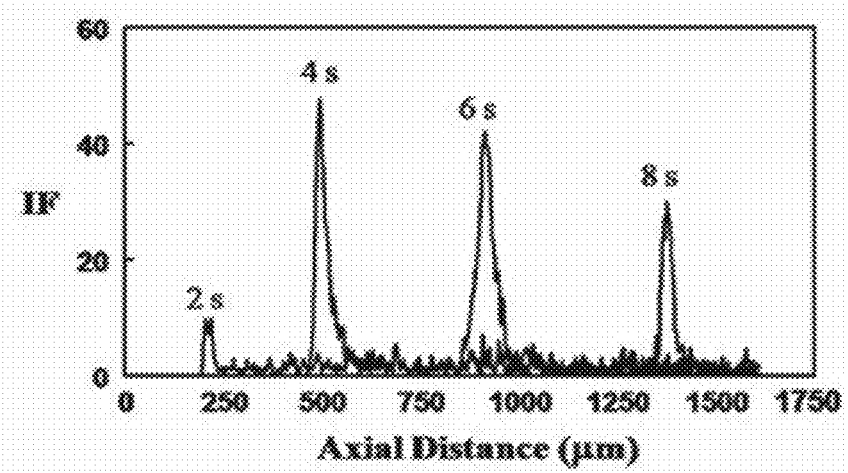

Referring to FIG. 2A, the fluorescent particles are trapped in an upstream region next to the anodic edge of the floating electrode 140 when the external electric field of 30 V/cm is imposed in the 1 mM KCl solution. As time increases, more fluorescent particles are trapped by the floating electrode 140, leading to the increase in particle concentration as shown in FIG. 2A. The trapped fluorescent particles are continuously supplied from an anodic reservoir (not shown) by a dominant electroosmotic flow (EOF) in an upstream of the floating electrode 140. In a downstream of the channel 110 between the floating electrode 140 and a cathodic reservoir (not shown), initial fluorescent particles before the external electric field is imposed move to the cathodic reservoir according to the net EOF directed toward the cathodic reservoir. Referring to FIGS. 2B through 2D, it may be determined that a flow rate of the fluorescent particles increases as the external electric field is high.

Figure 3:
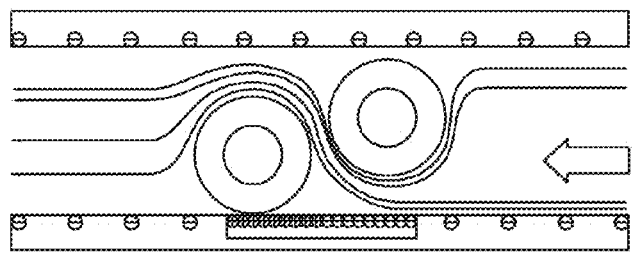
FIG. 3 is a schematic diagram of a flowing path of particles of the device of FIG. 1.

FIG. 3 is a schematic diagram of a flowing path of particles of the device 100 of FIG. 1. Referring to FIG. 3, a charge induced on the anodic (cathodic) side of the floating electrode 140 is negative (positive). Accordingly, nonuniform ICEO flow is formed and two opposite eddies are formed. A direction of the imposed ICEO flow near the cathodic side of the floating electrode 140 is opposite to a direction of an EOF over a substrate. Alternatively, the direction of the ICEO flow at the anodic side is the same as the direction of the electroosmosic flow. According to mass conservation, a clockwise (counterclockwise) circular motion is induced in an anodic (cathodic) region of the floating electrode 140, and the particles are trapped according to a clockwise ICEO flow formed in the anodic region of the floating electrode 140.

Figure 4:
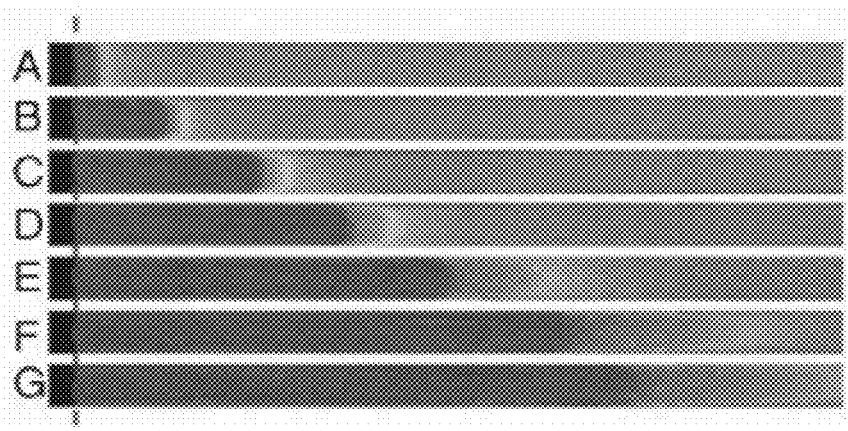
FIG. 4 is images obtained by continuously capturing concentrations and motions of 500 nm fluorescent particles in a 1 nm KCl solution injected into the device of FIG. 1 under an external electric field of 50 V/cm, after 6 seconds (A), 8 seconds (B), 10 seconds (D), 14 seconds (E), 16 seconds (F), and 18 seconds (G)

FIG. 4 is images obtained by continuously capturing concentrations and motions of 500 nm fluorescent particles in a 1 nm KCl solution injected into the device 100 of FIG. 1 under an external electric field of 50 V/cm, after 6 seconds (A), 8 seconds (B), 10 seconds (D), 14 seconds (E), 16 seconds (F), and 18 seconds (G). A left dotted line in FIG. 4 denotes the floating electrode 140.

FIG. 4 shows a movement of particles concentrated in front toward the anode 120. As an imposed electric field increases, the movement of the concentrated particles toward the anode 120 also increases. By using such a relationship, the movement of the concentrated particles toward the anode 120 may be easily adjusted. Accordingly, the device 100 of FIG. 1 may convert a moving direction of particles from the anode 120 to the cathode 130, which is engendered by EOF, into from the cathode 130 to the anode 120, by installing the floating electrode 140 and imposing a strong electric field.

Figure 5A:
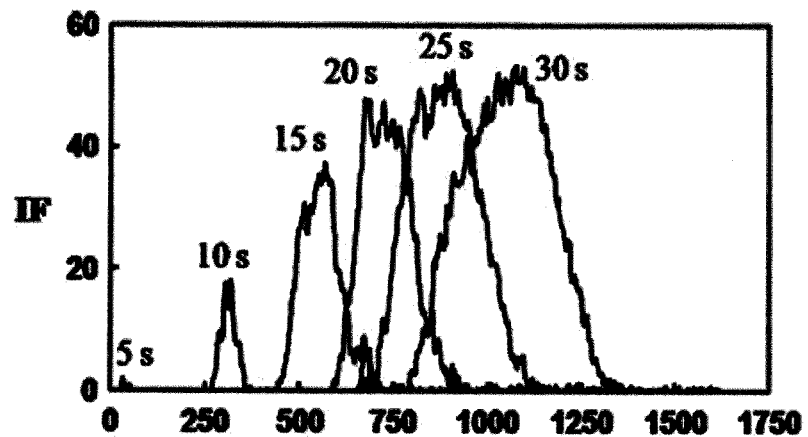
FIGS. 5A and 5B are graphs showing IF distributions of the device of FIG. 1 respectively in a 0.1 mM KCl solution and a 1 mM KCl solution under an external field of 50 V/cm.
Figure 5B:
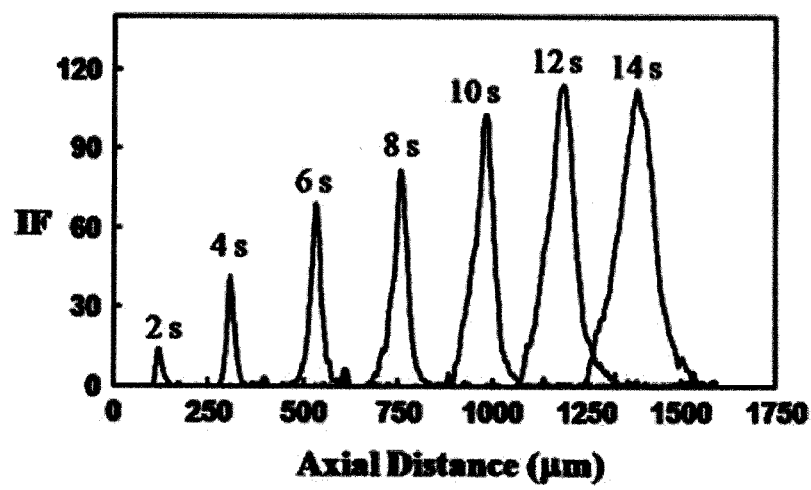

FIGS. 5A and 5B are graphs showing IF distributions of the device 100 of FIG. 1 respectively in a 0.1 mM KCl solution and a 1 mM KCl solution under an external field of 50 V/cm. Referring to FIGS. 5A and 5B, zeta-potentials of a dielectric wall of the channel 110 increase when concentration of an electrolyte solution decreases, and accordingly, the EOF increases. When the concentration of the electrolyte solution increases, the EOF toward the cathode 130 decreases leading to faster motion of the concentrated particles toward the anode 120.

Figure 6:
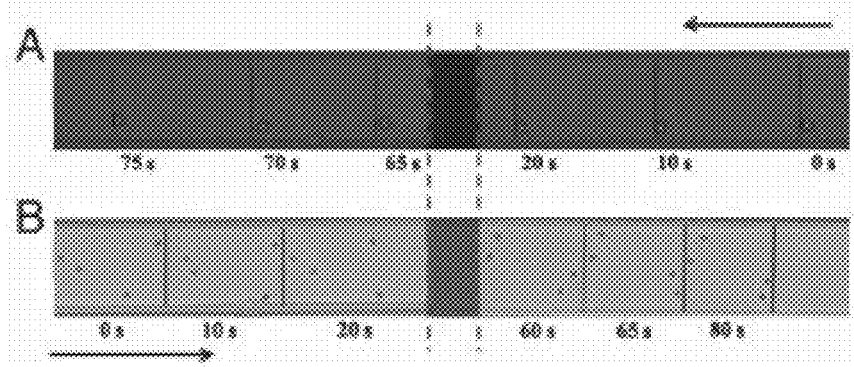
FIG. 6 is a diagram showing trajectories of 500 nm particles (A) and 4 μm particles (B) in the device of FIG. 1, in a 1 mM KCl solution under an external electric field of 10 V/cm.

FIG. 6 is a diagram showing trajectories of 500 nm particles (A) and 4 μm particles (B) in the device 100 of FIG. 1, in a 1 mM KCl solution under an external electric field of 10 V/cm.

Both 500 nm and 4 μm negatively charged particles migrate toward a cathode in a channel that does not include a floating electrode by dominant EOF.

In the presence of the floating electrode 140, however, referring to FIG. 6, when the external electric field of 10 V/cm is imposed on by the anode 120 and the cathode 130 of the device 100 of FIG. 1 and the 1 mM KCl solution is used as an electrolyte solution, the 500 nm particles move to the cathode 130 as shown in A of FIG. 6 whereas 4 μm particles move to the anode 120 as shown in B of FIG. 6 in a mixture of the 500 nm and 4 μm particles suspended in the 1 mM KCl solution. Accordingly, the 500 nm and 4 μm particles may be separated from each other.

Figure 7:
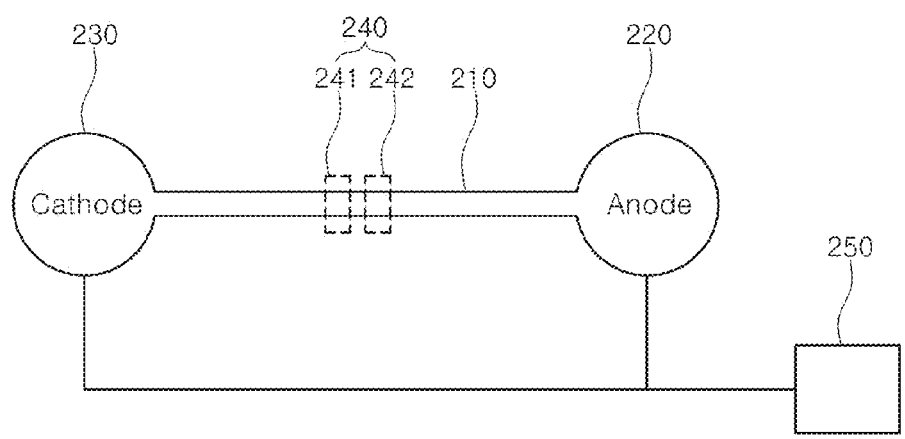
FIG. 7 is a plan view of a device for manipulating particles, according to another embodiment of the present invention.

FIG. 7 is a plan view of a device 200 for manipulating particles, according to another embodiment of the present invention. Referring to FIG. 7, the device 200 includes a channel 210, an anode 220, a cathode 230, a plurality of floating electrodes 240, and a DC power supply unit 250.

Since the channel 210, the anode 220, the cathode 230, and the DC power supply unit 250 of FIG. 7 are identical to those of FIG. 1, details thereof will be omitted and only a difference will be described.

Unlike the device 100 of FIG. 1, the device 200 of FIG. 7 includes the floating electrodes 240 including a pair of first and second metal strips 241 and 242.

In detail, the floating electrodes 240 includes the first metal strip 241 at an anodic side and the second metal strip 242 spaced apart from the first metal strip 241 by a predetermined distance.

Figure 8:
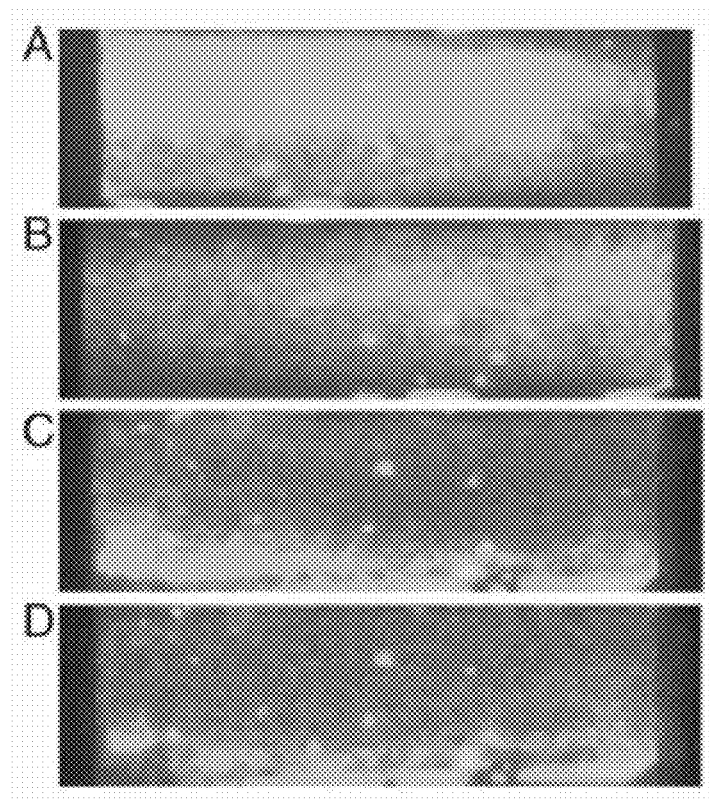
FIG. 8 is an image showing distributions of 500 nm particles between two floating electrodes of the device of FIG. 7, in a 1 mM KCl solution after 30 seconds (A), 1 minute (B), 7 minutes (C), and 10 minutes (D) under an external electric field of 30 V/cm.

FIG. 8 is an image showing distributions of 500 nm particles between the floating electrodes 240 of the device 200 of FIG. 7, in a 1 mM KCl solution after 30 seconds (A), 1 minute (B), 7 minutes (C), and 10 minutes (D) under an external electric field of 30 V/cm. In FIG. 8, dark regions at both ends represent the floating electrodes 240.

Figure 9A:
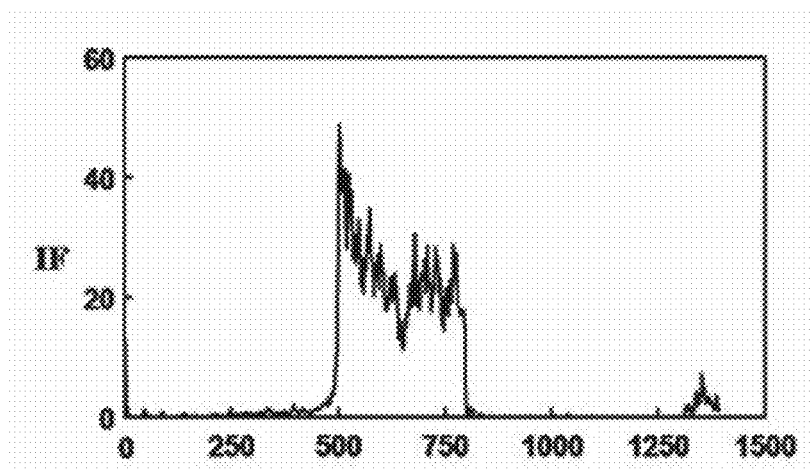
FIGS. 9A through 9C are graphs showing IF distributions between the two floating electrodes of the device of FIG. 7 respectively after 30 seconds, 1 minute, and 10 minutes, in a 1 mM KCl solution under an external electric field of 30 V/cm.
Figure 9B:
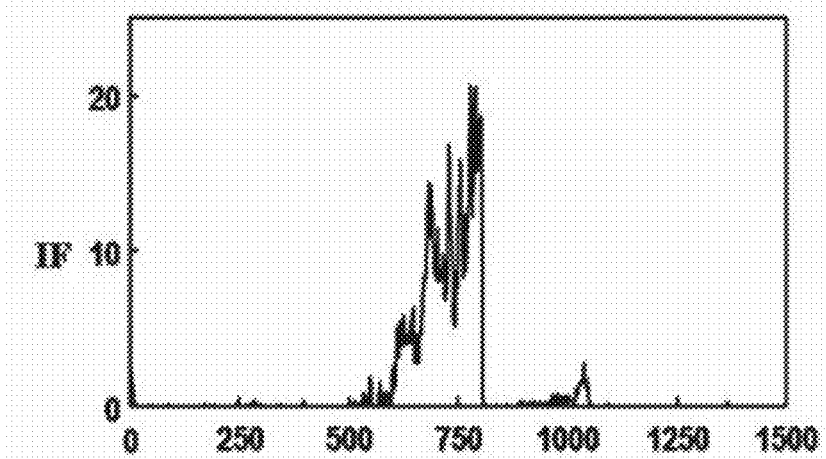
Figure 9C:
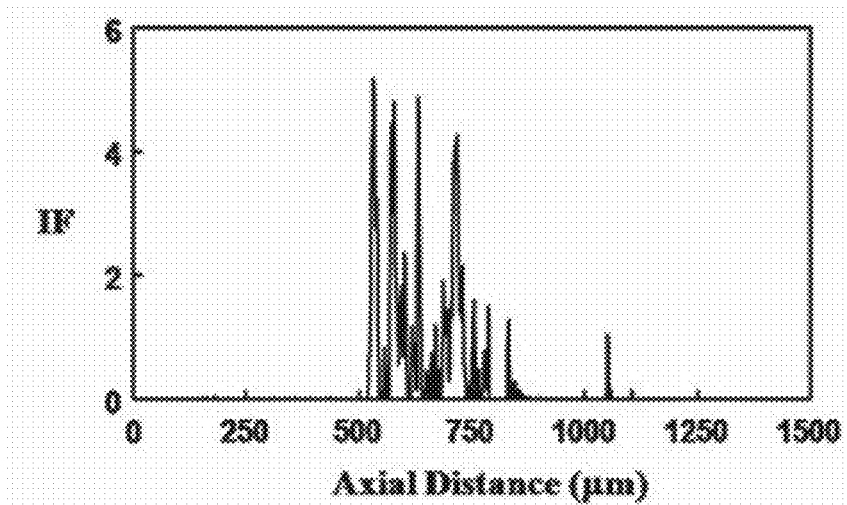

Referring to FIG. 8, when the relatively high external electric field of 30 V/cm is imposed on the anode 220 and the cathode 230, the 500 nm particles in the 1 mM KCl solution are trapped between the floating electrodes 240 for a short period of time. FIGS. 9A through 9C are graphs showing IF distributions between the floating electrodes 240 of the device 200 of FIG. 7 respectively after 30 seconds, 1 minute, and 10 minutes, in a 1 mM KCl solution under an external electric field of 30 V/cm.

FIGS. 9A through 9C show the IF distributions between the floating electrodes 240 respectively after 30 seconds, 1 minute, and 10 minutes under the external electric field of 30 V/cm when the 1 mM KCl solution is injected into the channel 210.

An axial distance in FIGS. 9A through 9C is originated from a cathodic edge of the first metal strip 241 of FIG. 7. The axial distances 0 to 500 μm, 500 to 800 μm, and 800 to 1300 μm respectively represent regions of the first metal strip 241, a gap between the first and second metal strips 241 and 242, and the second metal strip 242.

The IF in the gap between the first and second metal strips 241 and 242 in FIGS. 9A through 9C indicates that fluorescent particles are initially concentrated and trapped. However, as time increases, the IF decreases, i.e., the trapped fluorescent particles deplete due to a low leakage toward a cathodic reservoir.

The device 200 of FIG. 7 easily performs trapping and depletion of particles by using such a phenomenon.

Figure 10:
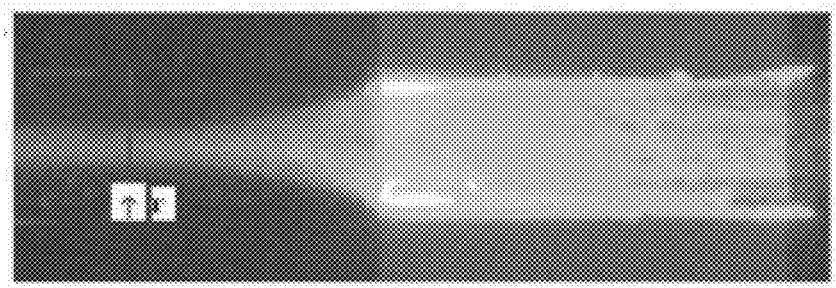
FIG. 10 is a snapshot of a part of the device of FIG. 7 in a 1 mM KCl solution under an external electric field of 30 V/cm.

FIG. 10 is a snapshot of a part of the device 200 of FIG. 7 in a 1 mM KCl solution under an external electric field of 30 V/cm.

Referring to FIG. 10, when a relatively high electric field of 50 V/cm is imposed on the device 200 of FIG. 7, particles are concentrated between the floating electrodes 240. The concentrated particles form a small stream along a centerline of the channel 210, and move to the cathode 230. Such concentrated particles are focused to a stream having a width less than 20 μm, and are used in microflow cytometry.

The devices 100 and 200 according to embodiments of the present invention do not require a complex structure, and easily manipulate particles by simply attaching one or more metal strips to a bottom wall of a channel.

Figure 11:
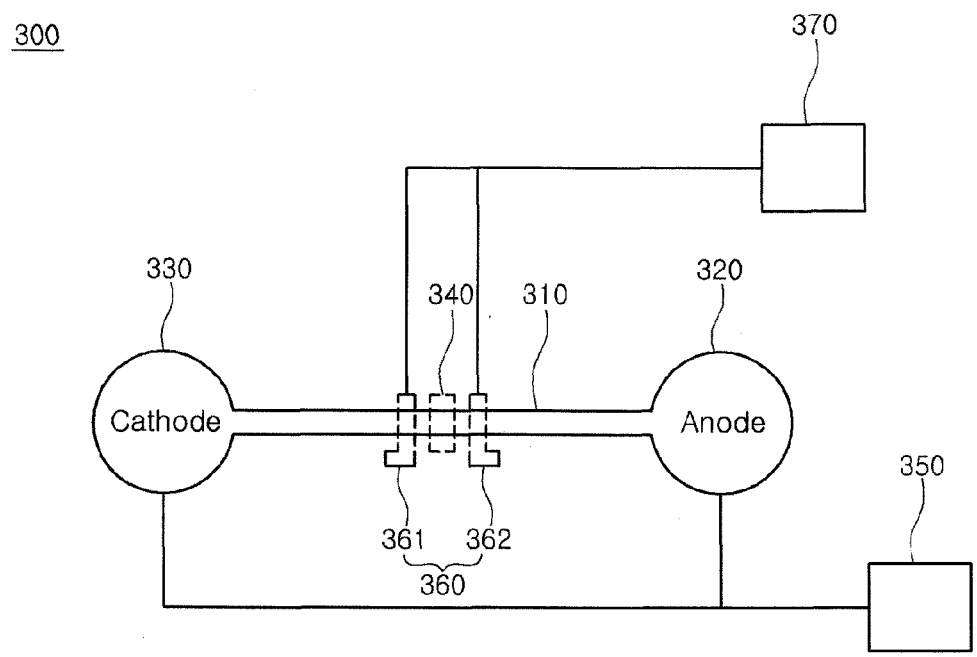
FIG. 11 is a plan view of a device for manipulating particles, according to another embodiment of the present invention.
Figure 12A:
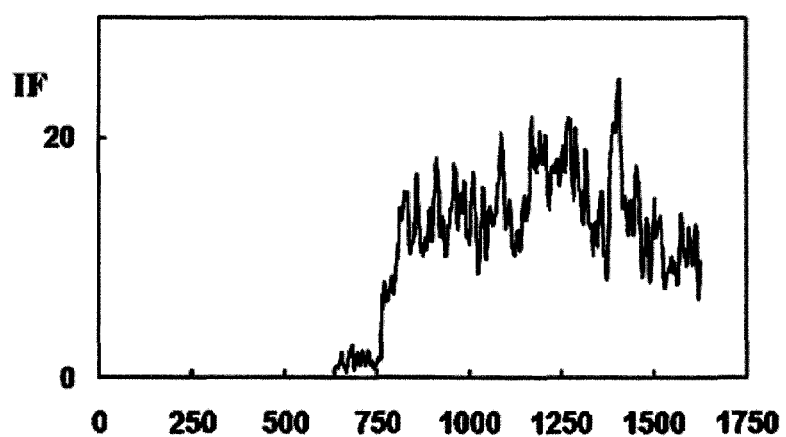
FIGS. 12A through 12D are graphs showing IF distributions in a 1 mM KCl electrolyte solution in the device of FIG. 11 respectively after 1 minute, 3 minutes, 5 minutes, and 8 minutes under conditions where an external electric field is 30 V/cm, a control electric field is about 31.67 V/cm, and a time interval between the external electric field and the control electric field is 15 seconds.
Figure 12B:
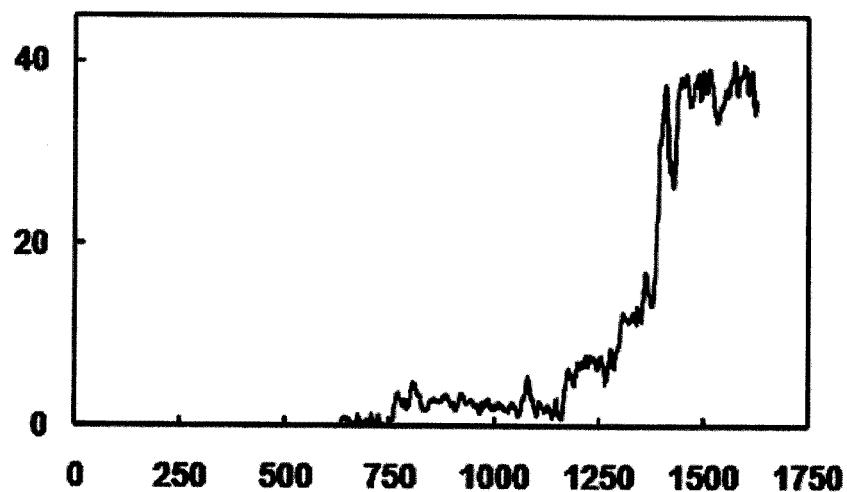
Figure 12C:
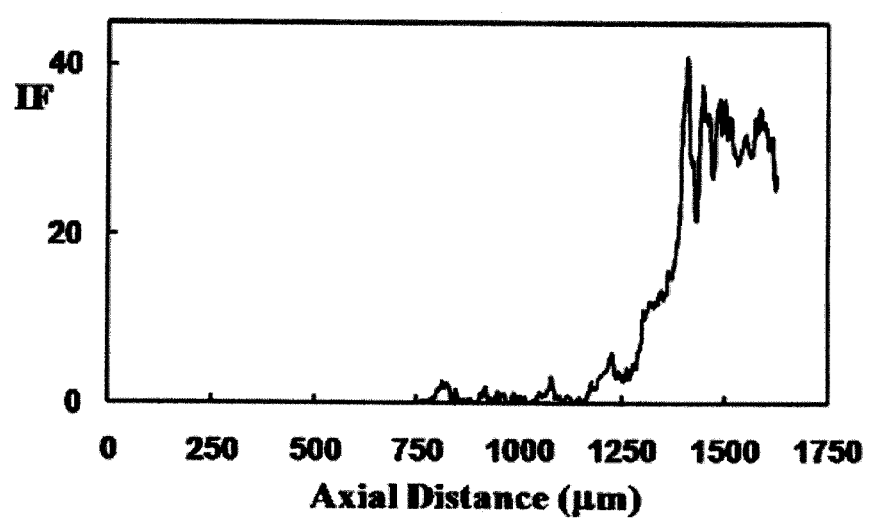
Figure 12D:
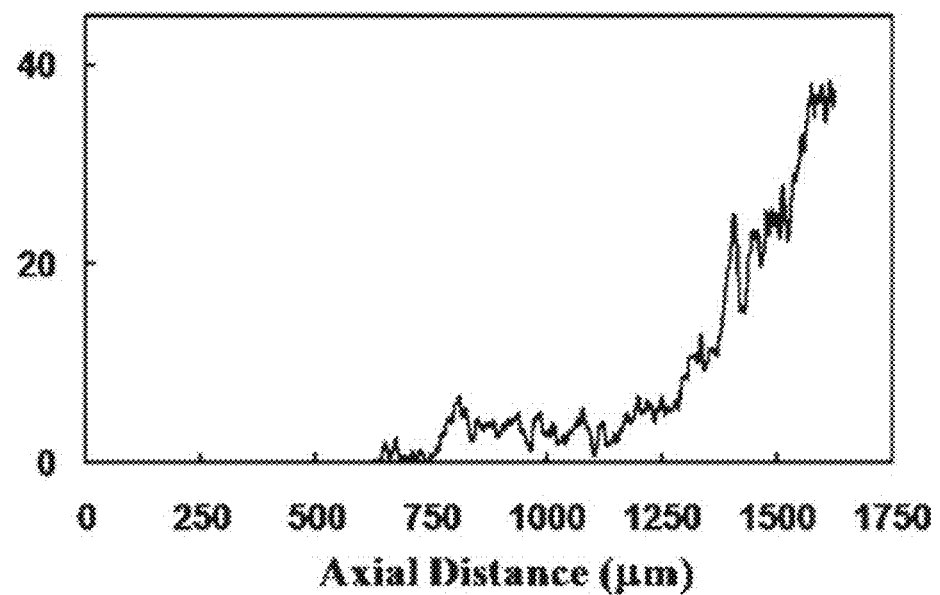

FIG. 11 is a plan view of a device 300 for manipulating particles, according to another embodiment of the present invention.

Referring to FIG. 11, the device 300 includes a channel 310, an anode 320, a cathode 330, a floating electrode 340, a DC power supply unit 350, two control electrodes 360, and a local control DC power supply unit 370. Since the channel 310, the anode 320, the cathode 330, the floating electrode 340, and the DC power supply unit 350 of FIG. 11 are identical to those of FIG. 1, details thereof will be omitted and only a difference will be described.

Unlike the device 100 of FIG. 1, the device 300 includes the two control electrodes 360 and the local control DC power supply unit 370. The two control electrodes 360 includes a left control electrode 361 and a right control electrode 362 respectively disposed at sides of the floating electrode 340 constituting a metal strip. The control electrodes 360 independently controls charge-induced electroosmosis phenomena engendered by the metal strip regardless of an external electric field imposed on the channel 310 by the anode 320 and the cathode 330. The control electrodes 360 have a micro or nano-size. Also, the local control DC power supply unit 370 is electrically connected to the control electrodes 360 and forms a control electric field by supplying a DC voltage to the control electrodes 360.

The local control DC power supply unit 370 governs a degree of polarization on the floating electrode 340 constituting the metal strip, and thus control a locally induced EOF, electrophoresis as well as ICEO flow in the vicinity of the floating electrode 340 positioned in a central region of a bottom wall of the channel 310.

Since a distance between the control electrodes 360 of the device 300 is very small, even if a voltage applied to the control electrodes 360 is small, a very high local electric field is induced across the floating electrode 340. Also, since the ICEO flow is proportional to the square of the overall electric field, the ICEO flow may be easily manipulated by tuning the magnitude and polarity of the voltage applied to the control electrodes 360.

The device 300 according to the current embodiment more flexibly manipulates the particles with a low voltage compared to a method of manipulating particles by using a floating electrode that is polarized only by an external electric field across a channel.

FIGS. 12A through 12D are graphs showing IF distributions in a 1 mM KCl electrolyte solution in the device 300 of FIG. 11 respectively after 1 minute, 3 minutes, 5 minutes, and 8 minutes under conditions where an external electric field is 30 V/cm and a control electric field is about 31.67 V/cm.

Figure 13:
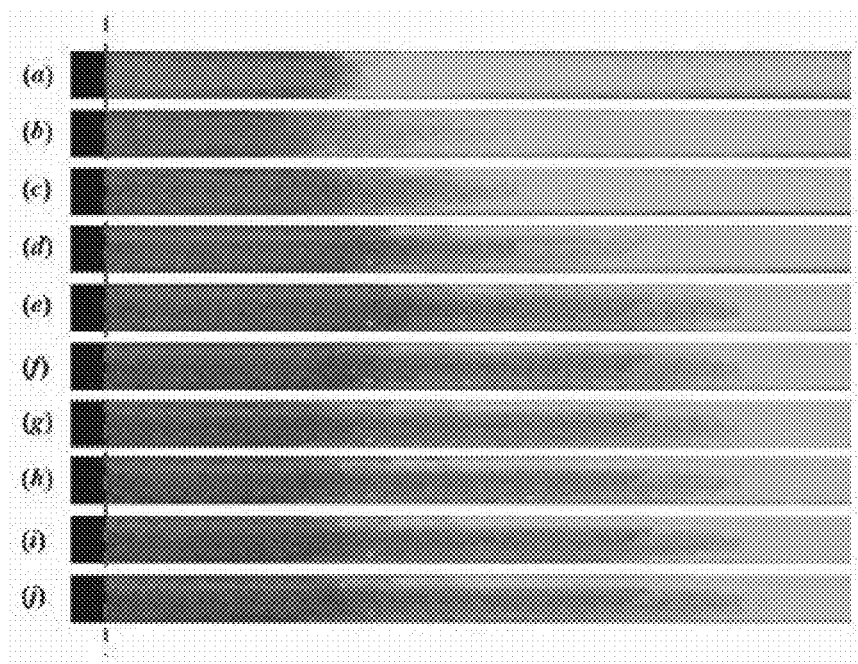
FIG. 13 is images obtained by continuously capturing enriched particles of the device of FIG. 11 after 20 seconds (A), 40 seconds (B), 1 minute (C), 2 minutes (D), 3 minutes (E), 4 minutes (F), 5 minutes (G), 6 minutes (H), 7 minutes (I), and 8 minutes (J), under the same conditions as FIG. 12.

FIGS. 12A through 12D depict the IF of 500 nm fluorescent particles in the 1 mM KCl electrolyte solution when the external electric field by the anode 320 and the cathode 330 is 30 V/cm and the control electric field by the control electrodes 360 is about 31.67 V/cm respectively after 1 minute, 3 minutes, 5 minutes, and 8 minutes. Here, a direction of the control electric field is the same as that of the external electric field and the control electric field is actuated after the external electric field has been turned on for 15 seconds. FIG. 13 shows sequential images of enriched particles under the same conditions as FIGS. 12A through 12D.

Referring to FIGS. 12A through 12D and 13, by dynamically modulating the control electric field, the device 300 keeps the enriched particles stationary at a prescribed position inside the channel 310, i.e., a position where other substances that need to interact with a target sample or sensor are positioned.

Figure 14:
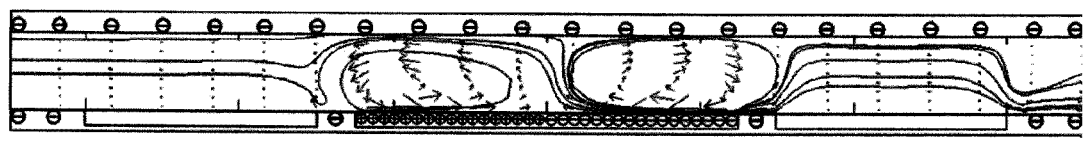
FIG. 14 is a diagram showing a flow field and streamline in a region of a floating electrode and control electrodes of the device of FIG. 11, when an external electric field is 10 V/cm and a control electric field is 31.67 V/cm.
Figure 15A:
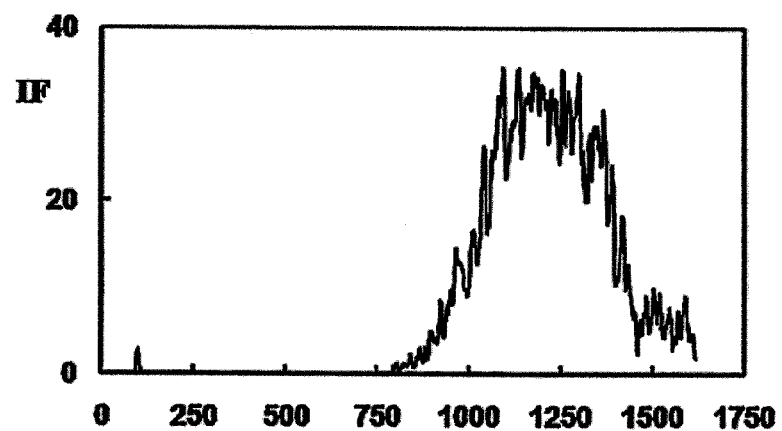
FIGS. 15A through 15D are graphs showing IF distributions in a 1 mM KCl electrolyte solution of the device of FIG. 11 respectively after 1 minute, 3 minutes, 5 minutes, and 8 minutes under conditions where an external electric field is 30 V/cm, a control electric field is about 31.67 V/cm, and a time interval between the external electric field and the control electric field is 15 seconds.
Figure 15B:
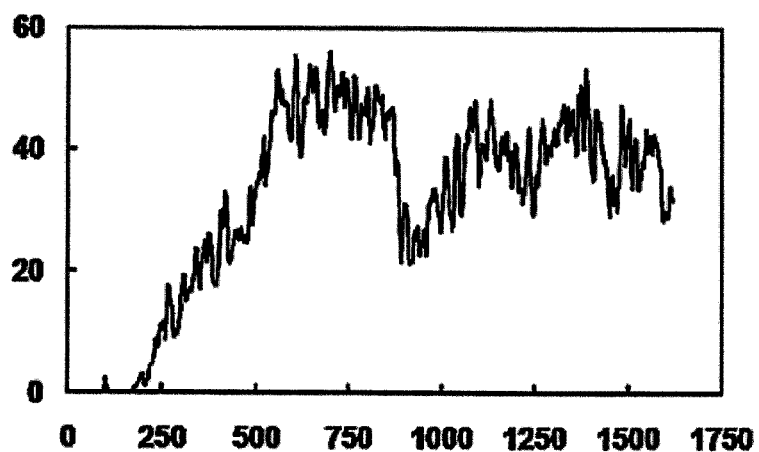
Figure 15C:
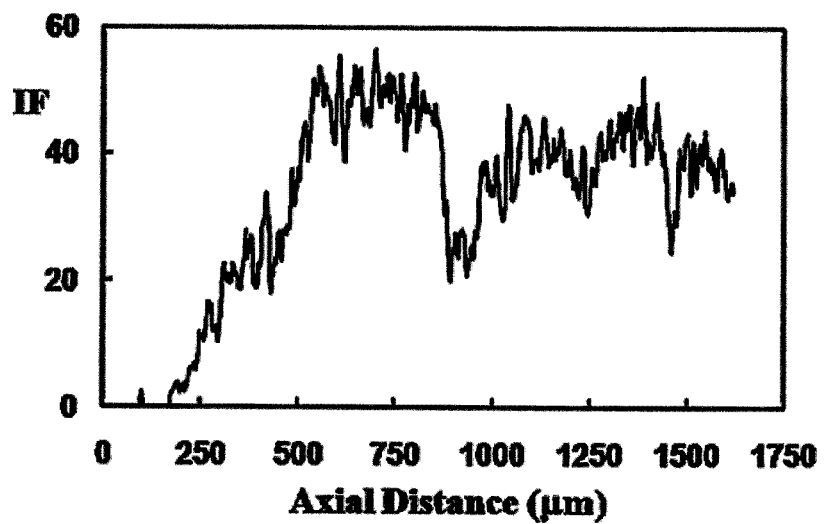
Figure 15D:
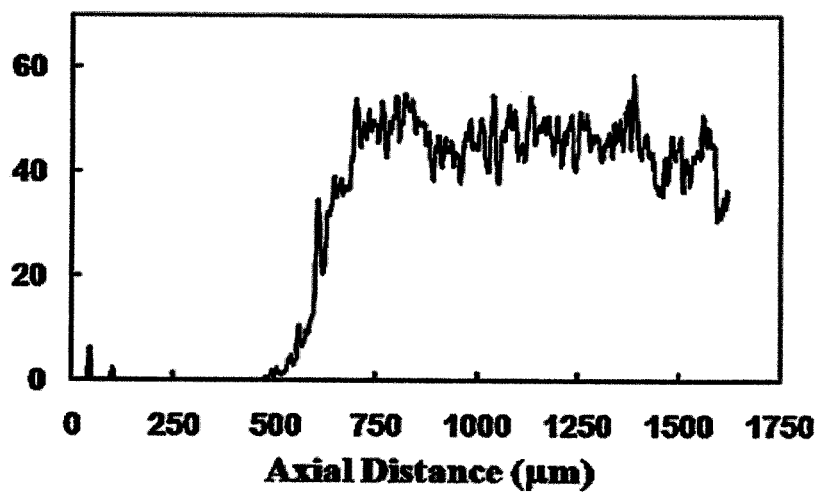

FIG. 14 is a diagram showing a flow field and streamline in a region of the floating electrode 340 and the control electrodes 360 of the device of FIG. 11. Under this condition, the ICEO flow in the region of the floating electrode 340 dominates over the EOF in upstream and downstream of the floating electrode 340. Clockwise (counterclockwise) vortices in an anodic (cathodic) region of the floating electrode 340 occupy an entire cross-section of the channel 310, and act like a valve to trap particles in the upstream of the floating electrode 340.

Positions of the front of the enriched particles may be controlled by the magnitude of the control electric field as well as a time interval between the external electric field and the control electric field. FIGS. 15A through 15D are graphs showing spatial IF distributions of normalized 500 nm fluorescent particles respectively after 1 minute, 3 minutes, 5 minutes, and 8 minutes.

Figure 16:
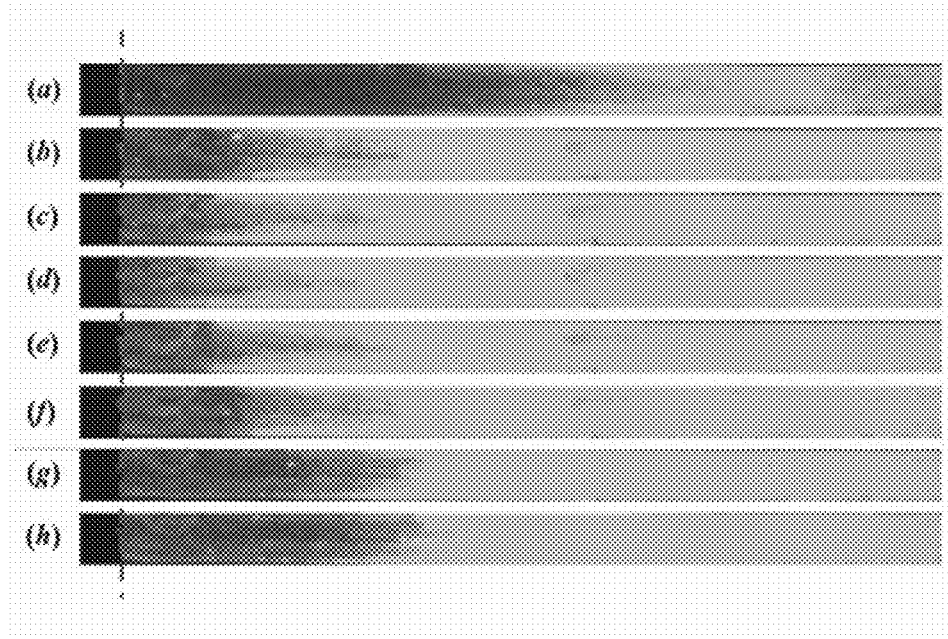
FIG. 16 is images obtained by continuously capturing enriched particles after 1 minute (A), 2 minutes (B), 3 minutes (C), 4 minutes (D), 5 minutes (E), 6 minutes (F), 7 minutes (G), and 8 minutes (H), under the same conditions as FIG. 15.

FIG. 16 depicts sequential images of the enriched particles under the same conditions as in FIGS. 15A through 15D. A time interval between the external electric field and the control electric field is 5 seconds, and other conditions are same as those of FIGS. 12A through 12D. Comparing FIGS. 15A through 15D and 12A through 12D, and FIGS. 16 and 13, it is clear that the enriched particles are kept closer to the right control electrode 362 according to reduction of the time interval between the external electric field and the control electric field.

In other words, the device 300 of FIG. 11 easily controls locations of the enriched particles by dynamically controlling the magnitude and polarity of the voltage applied to the control electrodes 360.

A method of manipulating particles by using a device for manipulating particles, according to an embodiment of the present invention will now be described.

Figure 17:
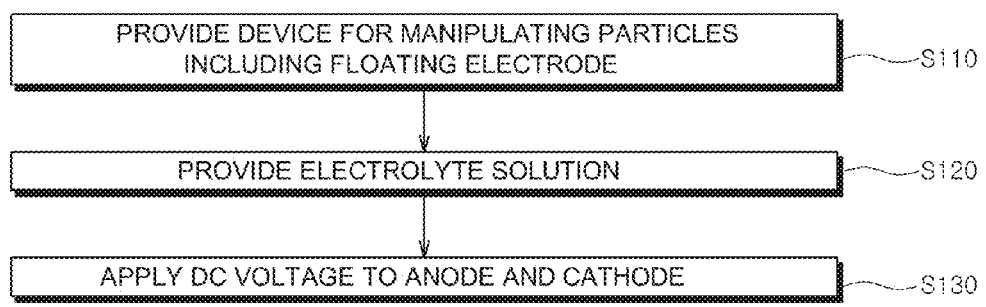
FIG. 17 is a flowchart illustrating a method of manipulating particles by using a device for manipulating particles, according to an embodiment of the present invention.

FIG. 17 is a flowchart illustrating the method using the device, according to the current embodiment of the present invention.

The method includes providing the device including a metal strip constituting a floating electrode on an inner wall of a channel (operation S110), providing an electrolyte solution to the channel (operation S120), and adjusting strength of a DC electric field imposed on the channel (operation S130).

The device includes a channel for accommodating an electrolyte solution including particles to be manipulated, an anode and cathode for imposing a DC electric field on the channel, a metal strip attached to an inner wall of the channel and resulting in induced-charge electroosmosis near a surface of the channel, and a DC power supply unit for supplying a DC voltage to the anode and the cathode, and thus is identical to the device 100 of FIG. 1 described above. Accordingly, details about the device will not be repeated herein.

When the device is ready, the electrolyte solution including the particles is provided to the channel. The electrolyte solution may be a 1 mM or 0.1 mM KCl solution. The particles is any one selected from the group consisting of polymers, metals, proteins, nucleic acids, cells, molecules, semiconducting particles, bioactive substances, and mixed particles thereof.

When the electrolyte solution is provided, the strength of the DC electric field imposed on the channel is adjusted to manipulate the particles in the electrolyte solution. The strength of the DC electric field imposed on the channel may be controlled such that the particles move toward the cathode or anode or such that the particles are locally concentrated in a part or at an end of the channel.

Figure 18:
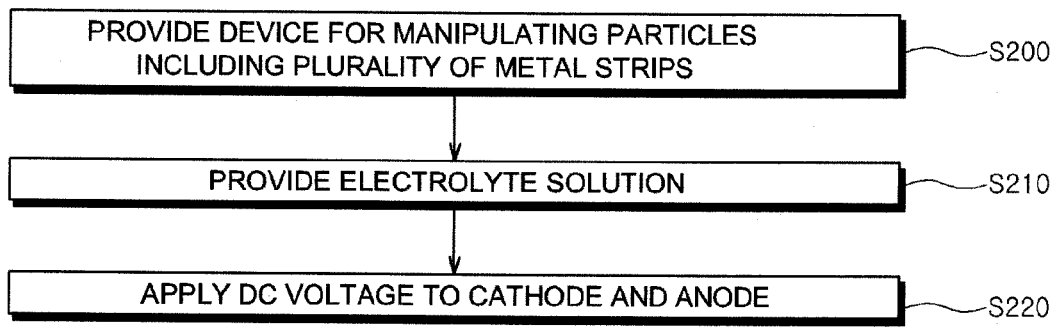
FIG. 18 is a flowchart illustrating a method of manipulating particles by using a device for manipulating particles, according to another embodiment of the present invention.

FIG. 18 is a flowchart illustrating a method of manipulating particles by using a device for manipulating particles, according to another embodiment of the present invention.

The method according to the current embodiment of the present invention includes providing the device including two metal strips as floating electrodes on an inner wall of a channel (operation S210), providing an electrolyte solution to the channel (operation S220), and adjusting a strength of a DC electric field imposed on the channel (operation S230).

Since the device is identical to the device 200 of FIG. 7 described above, details thereof will not be repeated herein.

When the device is ready, the electrolyte solution including particles is provided to the channel. Also, when the electrolyte solution is provided, the strength of the DC electric field imposed on the channel is adjusted to manipulate the particles in the electrolyte solution. The DC electric field imposed on the channel is controlled such that the particles are concentrated between the two metal strips and then subsequently squeezed into a stream flowing in a center region of the channel.

Figure 19:
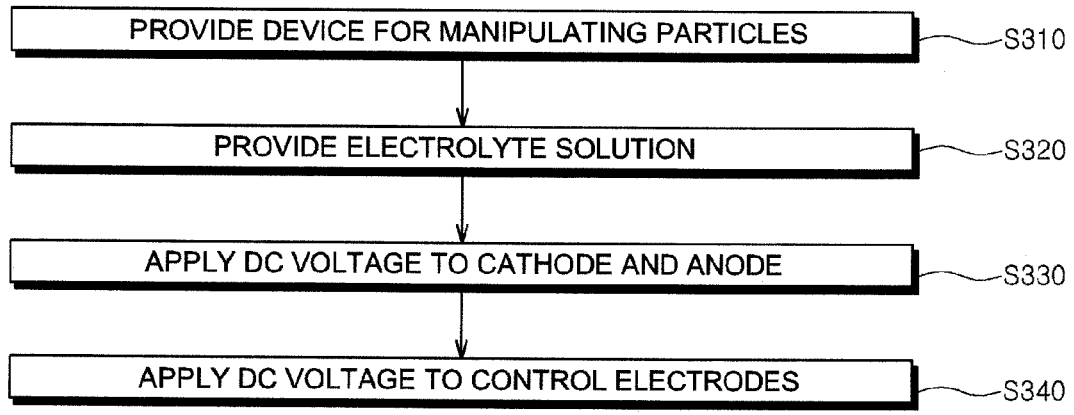
FIG. 19 is a flowchart illustrating a method of manipulating particles by using a device for manipulating particles, according to another embodiment of the present invention.

FIG. 19 is a flowchart illustrating a method of manipulating particles by using a device for manipulating particles, according to another embodiment of the present invention.

The method according to the current embodiment of the present invention includes providing the device including two control electrodes respectively at sides of a metal strip constituting a floating electrode on an inner wall of a channel (operation S310), providing an electrolyte solution to the channel (operation S320), and applying DC voltage to cathode and anode(operation S330), and manipulating particles by adjusting a strength of a DC electric field imposed on the control electrodes (operation S340).

Since the device is identical to the device 300 of FIG. 11 described above, details thereof will not be repeated herein.

When the device is prepared, the electrolyte solution including particles is provided to the channel. When the electrolyte solution is provided, the particles are enriched, and magnitude and polarity of a voltage applied to the two control electrodes are manipulated such that the enriched particles are kept stationary in a prescribed position of the channel.

According to the present invention, particles can be easily manipulated by including a floating electrode on an inner side of a channel.

Also, the particles can be easily manipulated by using a small voltage by including a control electrode in vicinity of the floating electrode included in the channel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manipulating particles, the method comprising:
providing a device for manipulating particles in an electrolyte solution, the device comprising:
a channel for accommodating an electrolyte solution including particles to be manipulated;
an anode and cathode for imposing a direct current (DC) electric field on the channel;
a floating electrode attached to an inner wall of the channel and resulting in induced-charge electroosmosis near a surface of the channel;
a DC power supply unit for supplying a DC voltage to the anode and the cathode;
two control electrodes respectively disposed on sides of the floating electrode and capable of independently tuning induced-charge electroosmosis engendered by the floating electrode regardless of a global electric field across the channel by locally controlling the DC voltage applied to the anode and cathode; and
a local control DC power supply unit for supplying a DC voltage to the two control electrodes,
providing the electrolyte solution including the particles into the channel;
imposing an electric field on the channel by applying a DC voltage to the anode and the cathode; and
manipulating the particles in the electrolyte solution by locally controlling a magnitude and polarity of the DC voltage applied to the two control electrodes.

2. The method according to claim 1, wherein the magnitude and polarity of the DC voltage applied to the two control electrodes are controlled such that the particles are enriched and the enriched particles are kept stationary at a prescribed position ins the channel.

3. A device for manipulating particles, the device comprising:
a channel for accommodating an electrolyte solution including particles to be manipulated;
an anode and cathode for imposing a direct current (DC) electric field on the channel;

a floating electrode attached to an inner wall of the channel and resulting in induced-charge electroosmosis near a surface of the channel;

a DC power supply unit for supplying a DC voltage to the anode and the cathode, two control electrodes respectively disposed on sides of the floating electrode and capable of independently tuning induced-charge electroosmosis engendered by the floating electrode regardless of a global electric field across the channel by locally controlling the DC voltage applied to the anode and cathode; and a local control DC power supply unit for supplying a DC voltage to the two control electrodes.

4. The device according to claim 3, wherein the channel has a micro or nano-size.

5. The device according to claim 3, wherein the particles are any one selected from the group consisting of polymers, metals, proteins, nucleic acids, cells, molecules, semiconducting particles, bioactive substances, and mixed particles thereof.

6. The device according to claim 3, wherein the two control electrodes have a micro or nano-size.

7. The device according to claim 3, wherein the floating electrode is a metal strip.

* * * * *